United States Patent Office 3,379,740
Patented Apr. 23, 1968

3,379,740
PROCESS FOR PREPARING COBALTOCENE-
p-CHLORANIL (1:2)
Yoshio Matsunaga, Stamford, Conn., assignor to American Cyanamid Company, Stamford, Conn., a corporation of Maine
No Drawing. Filed Nov. 2, 1964, Ser. No. 408,312
6 Claims. (Cl. 260—396)

ABSTRACT OF THE DISCLOSURE

A method of preparing cobaltocene-p-chloranil complex is provided by reacting in the presence of air a cobalticinium halide with an alkali metal salt of tetrachloro-p-benzosemiquinone in an aliphatic ketonic solvent whereby the so-formed complex finds utility in solid state semiconducting devices.

The present invention relates to a novel process for preparing cobaltocene-p-chloranil semiconducting complex. More particularly, it relates to the preparation of the semiconducting complex, cobaltocene-p-chloranil, under ordinary atmospheric conditions.

The molecular complex prepared in the present invention finds particular utility in solid state semiconductor devices, such as transistors, rectifiers, diodes, photocells, thermocouples and radiation detectors.

As is known, cobaltocene per se is highly unstable in the presence of air. Reactions which involve cobaltocene are, therefore, carried out in an inert atmosphere. Gases, such as argon or nitrogen, are employed. Further, special equipment is required to conduct inert atmosphere reactions. Obviously, these precautions necessarily result in increased costs. Since it is highly desirable to minimize and reduce costs whereby cobaltocene complexes can more readily and economically be prepared, a process accomplishing this end would satisfy an ever growing need.

It is, therefore, a principal object of the invention to provide a novel process for preparing cobaltocene molecular complexes under ordinary atmospheric conditions. It is a further object to provide a process for preparing cobaltocene molecular complexes utilizing ketonic solvents in the presence of air. These and other objects will become apparent from a consideration of the ensuing detailed description hereinbelow set forth with particularity.

According to the present invention, the molecular cobaltocene-p-chloranil complex represented by the formula:

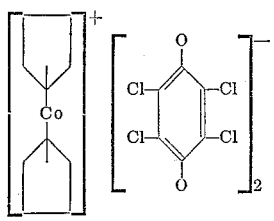

can be prepared in a straightforward manner. One method involves the reaction of one or more mols of a cobalticinium halide, such as cobalticinium trichloride or triiodide, with two mols of an alkali metal salt of tetrachloro-p-benzosemiquinone in the presence of air. Alternatively, another method involves reacting one or more mols of a cobalticinium halide, such as cobalticinium triiodide or cobalticinium trichloride, with a mixture comprising equimolar amounts of p-chloranil and an alkali metal salt of tetrachloro-p-benzosemiquinone either in the presence or absence of air.

In general, the reactions can be graphically written as follows:

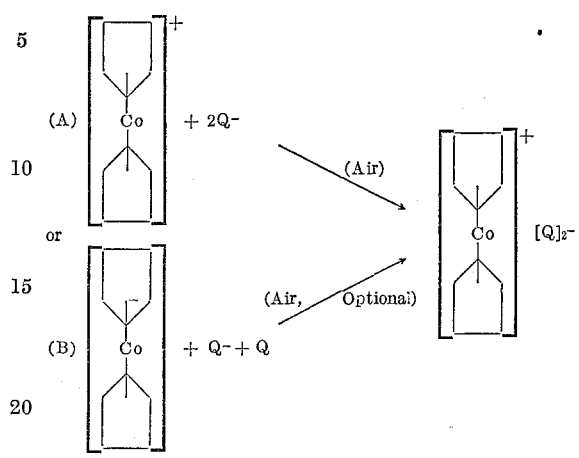

where $Q^-$ represents the alkali metal salt (i.e., the sodium, potassium or lithium salt of tetrachloro-p-benzosemiquinone) and Q represents p-chloranil.

Advantageously, the reactions outlined above are carried out under ordinary atmospheric conditions in an aliphatic unsubstituted ketonic solvent of from 3 to 9 carbon atoms for each of the reactants. Such solvents are, for instance, acetone, diethyl ketone, methyl isobutyl ketone, dipropyl ketone or diisobutyl ketone.

Temperatures ranging from about 20° C. to 40° C. are contemplated, although higher or lower temperatures can be used, if desired. Of course, special equipment is not necessary or required to carry out the novel process since the reaction takes place under ordinary atmospheric conditions.

The following examples are presented merely by way of illustration and are not to be deemed limitative of the present invention.

EXAMPLE 1

Cobalticinium triiodide, 1.14 g. (2 mols), p-chloranil, 0.49 g. (2 mols) and the alkali salt of tetrachloro-p-benzosemiquinone 0.57 g. (2 mols) were added to 50 ml. of acetone and stirred for 20 minutes (in air). A brown crystalline product was filtered and washed with acetone then with benzene. A 75% yield was obtained. Calcd. for $(C_{10}H_{10}Co)(C_6Cl_2O_2)_2$: C, 38.8%; H, 1.5%; Cl, 41.8%. Found: C, 38.9% H, 1.9% Cl, 41.4%.

EXAMPLE 2

Cobalticinium triiodide, 1.14 g. (2 mols) and the alkali salt of tetrachloro-p-benzosemiquinone 0.57 g. (2 mols) were added to 50 ml. of acetone and stirred for 20 minutes. A brown crystalline product was filtered and washed with acetone then with benzene. The yield was 63%, based on the semiquinone salt.

I claim:
1. A process for preparing cobaltocene-p-chloranil (1:2) which comprises: reaction in the presence of air at least one mol of (a) a cobalticinium halide and (b) about 2 mols of an alkali metal salt of tetrachloro-p-benzosemiquinone in the presence of an aliphatic ketonic solvent of from 3 to 9 carbon atoms, and recovering resultant cobaltocene-p-chloranil (1:2) in good yield.
2. The process according to claim 1 in which the ketonic solvent is acetone.
3. The process according to claim 1 in which the cobalticinium halide is cobalticinium triiodide.

4. A process for preparing cobaltocene-p-chloranil (1:2) which comprises: reacting at least one mol of (a) a cobalticinium halide and (b) a mixture comprising one mol of an alkali metal salt of tetrachloro-p-benzosemiquinone and one mol of p-chloranil in the presence of an aliphatic ketonic solvent of from 3 to 9 carbon atoms, and recovering resultant cobaltocene-p-chloranil (1:2) in good yield.

5. The process according to claim 4 in which the cobalticinium halide is cobalticinium triiodide.

6. The process according to claim 4 in which the ketonic solvent is acetone.

References Cited
UNITED STATES PATENTS 3,255,392   6/1966   Wahlig _____ 317—234

LORRAINE A. WEINBERGER, *Primary Examiner.*

A. THAXTON, *Assistant Examiner.*